(12) United States Patent
Minami et al.

(10) Patent No.: US 6,468,668 B1
(45) Date of Patent: Oct. 22, 2002

(54) CELLULOSIC COMPOSITE PRODUCT AND A METHOD OF PRODUCING THE SAME

(75) Inventors: Masato Minami, Atsugi (JP); Chieko Mihara, Isehara (JP); Toshihiko Takeda, Atsugi (JP); Yoshihiko Kikuchi, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/394,418

(22) Filed: Sep. 13, 1999

(30) Foreign Application Priority Data

| Sep. 14, 1998 | (JP) | 10-276424 |
| Feb. 9, 1999 | (JP) | 11-031793 |
| Mar. 4, 1999 | (JP) | 11-056669 |

(51) Int. Cl.$^7$ ............ B32B 27/10; A61K 9/14; C08G 18/48
(52) U.S. Cl. ........ 428/533; 428/481; 424/488; 435/101; 527/302; 536/56; 536/57
(58) Field of Search .............. 428/481, 533; 527/302; 424/488; 435/101; 536/56, 57

(56) References Cited

U.S. PATENT DOCUMENTS

| 5,714,230 A | * | 2/1998 | Kameoka et al. | 428/141 |
| 5,964,933 A | * | 10/1999 | Nakamura | 106/203.1 |
| 6,124,384 A | * | 9/2000 | Shiraishi et al. | 524/35 |

FOREIGN PATENT DOCUMENTS

| EP | 0654492 A2 | 5/1995 |
| EP | 0805181 A1 | 11/1997 |
| EP | 0814093 A2 | 12/1997 |
| JP | 206904 | 7/1994 |
| JP | 032798 | 2/1996 |

OTHER PUBLICATIONS

Keisuke Kurita, et al., "Synthetic Polymers Containing Sugar Residues V. Polyesters Derived from D–Cellobiose and Dicarboxylic Acid Chlorides by Direct Polycondensation"; J. Polymer. Sci., 18, pp. 365–70 (1980).

* cited by examiner

Primary Examiner—James O. Wilson
Assistant Examiner—Leigh C. Maier
(74) Attorney, Agent, or Firm—Fitzpatrick, Cella, Harper & Scinto

(57) ABSTRACT

The present invention relates to a cellulose derivative having biodegradability, recycling properties, excellent mechanical strength and mold processability. The cellulose derivative is a product of a monosaccharide derivative or oligosaccharide derivative and cellulose. The monosaccharide derivative or oligosaccharide derivative is a copolymer of a saccharide and dicarboxylic acid.

24 Claims, 2 Drawing Sheets

CELLULOSIC COMPOSITE PRODUCT AND A METHOD OF PRODUCING THE SAME

BACKGROUND OF THE INVENTION

1. Field of the Invention

The present invention relates to a composite product having improved properties formed from cellulose, and a method of producing the same.

2. Description of the Prior Art

Cellulose is a structural polysaccharide, which is the main component of the cell wall of a higher plant and makes up ⅓–½ of the plant body. Cellulose is the most abundant organic compound on the earth.

Due to the strong hydrogen bonds between the hydroxyl groups, cellulose exhibits high crystallinity between the aligned main chains. Cellulose is a polymeric compound which does not show thermoplasticity. Cellulose is derived from plants and also produced by microorganisms. Cellulose produced by microorganisms is bacterial cellulose. The solubility of the plant-derived cellulose in a solvent is improved by treatment with an alkali or by introducing a soluble substituent. The resulting solution is poured into a mold having a desired shape and the solvent is removed to give a molded product of the cellulose. To form bacterial cellulose, xanthan gum is added to a culture medium for cellulose-producing bacteria to control the crystal structure of the bacterial cellulose, as has been reported in Japanese Patent Laid-Open No. 6-206904. Further, a method of forming a sheet material having high mechanical strength is conducted by applying pressure and heat to the bacterial cellulose film comprising ribbon-like microfibrils produced by cellulose-producing bacteria, as reported in Japanese Patent Publication No. 8-32798. Also, a so-called powder molding method is known in which cellulose in the form of a fine powder is pressurized and heated.

Recently, as the environmental problems and resource problems have become more serious, cellulose has become popular again since it has biodegradability, and is a resource which can be regenerated in nature. However, cellulose is not soluble using conventional solvents and is not deemed appropriate for film applications requiring cellulose solutions. When dissolved in a special solvent such as copper-ammonia solution and the like, a molded cellulosic product, such as a film, can be produced by a solvent method, but the molded product obtained in such a method is rather poor in flexibility and its quality is unacceptable for practical use. In addition, since cellulose does not exhibit thermoplasticity, it has been very difficult to produce a thermoformed article by the hot-press method.

SUMMARY OF THE INVENTION

In view of the above-mentioned technical background, the prevent invention provides a cellulosic composite product whose processability is far more improved than a cellulose with the biodegradability, the original property of cellulose, intact. The present invention also provides a method of producing a cellulosic composite product whose processability is improved while maintaining the original biodegradability.

According to a first aspect of the present invention, there is provided a cellulosic composite product which can achieve the above-mentioned object which comprises cellulose and a compound represented by the following formula (I);

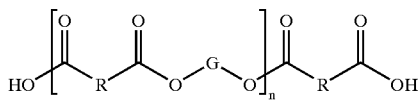

wherein, R represents a substituted or unsubstituted alkylene group or a substituted or unsubstituted arylene group, G represents a monosaccharide residual group or an oligosaccharide residual group and n is degree of polymerization and is an integer between 1 and 5000.

According to another aspect of the present invention, there is provided a method for producing a cellulosic composite product comprising the steps of: providing a liquid containing dissolved or dispersed cellulose and a compound represented by the following formulae (I);

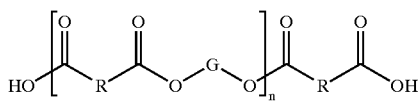

wherein R represents a substituted or unsubstituted alkylene group or a substituted or unsubstituted arylene group, G represents a monosaccharide residual group on an oligosaccharide residual group and n is an integer between 1 and 5000; and evaporating the liquid by heating.

According to further aspect of the present invention, there is provided a process for producing a composite product comprising culturing cellulose-producing bacteria in a culture medium containing a compound of formula (I)

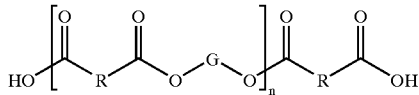

wherein R represents a substituted or unsubstituted alkylene group or a substituted or unsubstituted arylene group, G represents a monosaccharide residual group or an oligosaccharide residual group and n is an integer between 1 and 5000; and making the bacteria produce cellulose.

In addition, the invention includes the composite product is formed by interacting cellulose and the compound of formula (I) above. Further the invention also includes the composite product produced by providing a liquid containing dissolved or dispersed cellulose and a compound of formula (I) above and then evaporating the liquid by heating. Further, the invention encompasses the composite product produced by culturing cellulose-producing bacteria in a culture medium containing a compound of formula (I) above and then making the bacteria produce cellulose.

In general, it is believed that the poor processability of cellulose is caused by its high crystallinity. This high crystallinity is believed derived from strong hydrogen bonds between the main chains of the microfibril structure of cellulose which become aligned. The inventors believe that the similarity' in structure between cellulose and the monosaccharide or oligosaccharide derivative represented by formulae (I) permits good bonding capacity between the compound of formula (I) and cellulose. In other words, the compound of formula (I) has good affinity with cellulose. The composite product of the formula (I) compound and cellulose is characterized by an intermolecular-interaction between the two compounds and exhibits far better processability than cellulose. A molded product made of the composite product has good mechanical strength and flexibility.

The exact reason why the present composite product provides the aforementioned beneficial properties is still unknown, but it may be attributable to the structure of the compound of formula (I). That is, the compound of formula (I) has a similarity to cellulose in structure, particularly in the sugar moiety (G) having a hydroxyl group, and a dissimilarity to cellulose in the alkylene or arylene moiety (R). The moiety (G) may act to express an affinity to cellulose on the one hand, while on the other hand, the moiety (R) contained in the structure in a certain ratio, does not form any hydrogen bonds with cellulose and may act to reduce the high crystallinity of cellulose.

DESCRIPTION OF THE PREFERRED EMBODIMENTS

Figure 1:
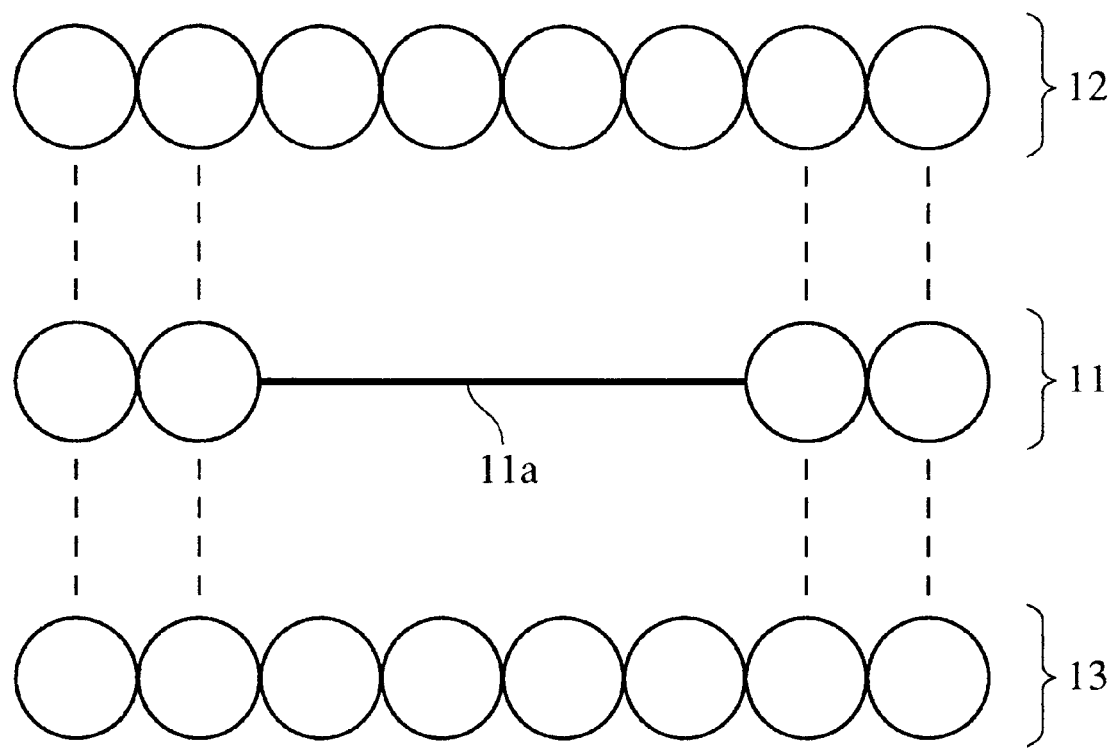
FIG. 1 is a diagrammatic sketch illustrating the structure of the composite product according to the present invention, which comprises cellulose and cellobiose derivative.

A composite product according to an embodiment of t:he present invention comprises the reaction product of cellulose and a compound represented by the following structural formula (I).

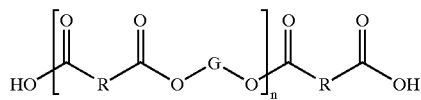

The formula I compound is a monosaccharide derivative or oligosaccharide derivative.

As mentioned above, a compound engaging in an intermolecular interaction with cellulose which alleviates the strong crystallinity of cellulose is preferably used in the composite product according to the present embodiment.

The sites which can hydrogen bond with cellulose include, for example, (i) hydroxyl groups in the saccharide residual group on the monosaccharide derivative or oligosaccharide derivative, or (ii) oxygen atom(s) in the ring. When the saccharide moiety of the monosaccharide derivative or oligosaccharide derivative is substituted by an ester group such as an acetyl group, hydrogen bonds can be formed between the carbonyl group contained in the acetyl group and the hydroxyl group in the cellulose.

A typical saccharide residual group G is a cellobiose residual group of the formula II:

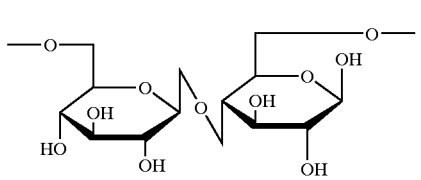

The hydroxyl (OH) groups in the cellobiose residual group (II) can hydrogen bond with cellulose, as for example, when a sebacoyl compound, such as,

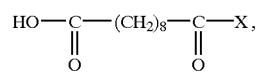

where X is halogen, is condensed with the cellobiose residual group to form the formula I compound.

Examples of a compound satisfying the above structural requirements include, for example, a monosaccharide derivative or oligosaccharide derivative, and specifically a compound having the structure represented by formula (I).

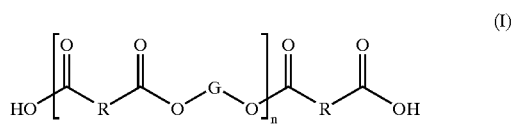

In the general formula (I), R represents an alkylene group or an arylene group having 1 or more carbon atoms. G represents a monosaccharide residual group or an oligosaccharide residual group. It is preferable that the alkylene group contains 1–20 carbon atoms. It is particularly preferred that G represent an oligosaccharide residual group and the alkylene group contains 6–14 carbon atoms, or G represents a monosaccharide residual group and the alkylene contains 4–14 carbon atoms. The resulting composite product shows excellent thermoplasticity and, therefore, the composite product acquires thermoformability. In the alkylene or arylene R groups, the hydrogen atoms at one or more sites can be substituted with another group. Examples of such substituent, include, for example, a linear or branched alkyl group having from 1 to about 6 carbon atoms and the like.

G can be a di- or higher substituted group. The letter n represents the degree of polymerization (repeating groups) and is an integer between 1 and 5000, preferably between 20 and 3000.

The monosaccharide derivative or oligosaccharide derivative represented by the above-mentioned general formula (I) can be synthesized, for example, by (a) reacting the hydroxyl group of a monosaccharide or an oligosaccharide containing the monosaccharide residual group or the oligosaccharide residual group, "G", with a COOH group or COCl group of a dicarboxylic acid containing "R" in the molecule, to form an ester bond; (b) carrying out ester exchange of the dicarboxylic ester with the monosaccharide or oligosaccharide; or (c) employing an enzyme reaction or the like to form a bond.

The Monosaccharide or Oligosaccharide

Examples of a monosaccharide or oligosaccharide employed herein include (i) oligosaccharides such as cellobiose, maltose, lactose, isomaltose, nigerose, trehalose, melibiose, cellotriose, maltotriose, cellotetraose, maltotetraose, cellopentaose, maltopentaose, cellohexaose, maltohexaose and the like, and (ii) monosaccharides such as glucopyranose, mannopyranose, galactopyranose, and the like. These monosaccharides and oligosaccharides can be substituted by an ester group such as acetyl group.

For synthesizing the derivative of the above-mentioned general formula (I), one or more saccharides selected from these monosaccharides and oligosaccharides can be employed.

For such saccharides, it is particularly preferable to use a substance obtained by, for example, decomposing paper (old paper and the like) in order to effectively use existing resources.

Since the use of copying machines and printers has become dramatically widespread, the volume of paper waste has greatly increased. The system of recycling newspaper and corrugated cardboard paper as regenerated paper, has become well established. However, the demand for regenerated paper is limited. For example, the ratio of waste paper present in the raw paper stock materials is calculated to be no more than 66.1% ("Ecomaterial Dictionary" Science Forum Co., Ltd). The recent trend to recycle paper promotes only the recovery of used paper and ends up increasing the stock of unused recycled paper.

Besides, paper with a large amount of printing, coated paper, or paper containing a large amount of additives often cannot be made into regenerated paper due to the large amount of impurities present therein.

However, the above-mentioned waste paper of low quality can be effectively utilized for uses other than in regenerated paper, by chemically modifying cellulose per se, which is the main component of the paper, and decomposing the cellulose to the saccharide level to produce the above-mentioned saccharide derivative. Examples of a method of producing the above-mentioned saccharides from paper include, for example, a method in which $\beta1\rightarrow4$ bond of the cellulose fibre constituting the paper is cleaved by an acid such as sulfuric acid or hydrochloric acid or by an enzyme such as cellulase and the like, to give glucose (monosaccharide) and cellooligosaccharide (2–10 saccharide).

A Dicarboxylic Acid

Examples of a dicarboxylic acid containing "R" in the molecule include, for example, aliphatic dicarboxylic acids, such as malonic acid, succinic acid, glutaric acid, adipic acid, pimelic acid, suberic acid, sebacic acid, and dodecanedioic acid and the like, and aromatic dicarboxylic acids, such as phthalic acid, isophthalic acid, terephthalic acid and the like.

Cellulose

As cellulose, plant derived cellulose and bacterial cellulose can be used. With bacterial cellulose, microfibrillar cellulose of higher purity than that of plant-derived cellulose can be obtained. Another advantage is that, as will be described later, the composite product according to the present invention can be produced while the cellulose-producing bacteria are cultured. One of the preferable embodiments, from the view point of effective use of resources, is that the cellulose derived from paper (old paper and the like) as mentioned above is employed as the cellulose. Specifically, paper can be disintegrated in a weak alkaline aqueous solution to extract the cellulose fibers from the paper. The cellulose fibers obtained as the residue in the above-mentioned process for decomposing the paper into saccharides, can be also used as the cellulose in this embodiment. From these cellulose fibers, cellulose can be eluted using an organic solvent such as a mixed solvent of dimethyl acetamide and lithium chloride.

Cellulose Producing Bacterium

The bacterium to produce bacterial cellulose is not particularly limited. However, one or more kinds of known bacteria which produce bacterial cellulose, such as *Acetobacter aceti* subsp. *xylinum* ATCC10821, *A. pasteurianus* ATCC 10821, *A. rancens, Sarcina vntriculi, Bacterium xyloides*, bacterium belonging to the genus Pseudomonas, bacterium belonging to the genus Agrobacterium and the like, can be used.

Bacteria can produce bacterial cellulose according to known bacteria cultivating conditions. Accordingly, a microorganism may be inoculated in an ordinary nutrient culture medium containing a carbon source, a nitrogen source, inorganic salts and, if necessary, organic trace nutrients, such as amino acids and vitamins, and the inoculated medium allowed to stand or slowly stirred while being aerated to allow the bacteria to produce bacterial cellulose.

As examples of a typical carbon source, for example, glucose, sucrose, maltose, starch hydrolysates, and molasses can be used, and ethanol, acetic acid and citric acid and the like can be used alone or in addition to the above-mentioned saccharides. As examples of a nitrogen source, there are, for example, ammonium salts such as ammonium sulfate, ammonium chloride, and ammonium phosphate, and organic or inorganic nitrogen sources such as nitrate salts, urea, and peptone and the like. As examples of an inorganic salt, phosphates, magnesium salts, calcium salts, iron salts and manganese salts and the like can be used. Examples of an organic trace nutrient include amino acids, vitamins, fatty acids, nucleic acid and peptone, casamino acid, yeast essence, and soybean protein hydrolysates and the like. When auxotrophic bacteria are employed, which demand amino acids and the like for growth, the required nutrient shall be further supplied. The culture conditions can be conventional as well, and the bacteria can be cultured for 1–30 days, while pH is controlled between 5 and 9, and the temperature is controlled between 20 and 40° C.

Production Method

The method of producing the composite product of the present invention is not particularly limited. However, it is preferable to provide a condition under which cellulose and a monosaccharide or an oligosaccharide derivative chemically interact with cellulose. More specifically a monosaccharide or oligosaccharide derivative and cellulose in the form of a microfilament and/or a fine powder, are mixed in a liquid medium in which the monosaccharide or oligosaccharide derivative can be dissolved, dispersed or swollen. Then, the liquid containing cellulose and the derivative is heated to evaporate the liquid medium to yield the composite product of the present invention.

The liquid medium selected depends, in part, on the solubility of the monosaccharide or oligosaccharide derivative, its molecular weight and the like. Typical liquid media include: water; acetone; alcohol, such as methanol, ethanol and the like; ether, as tetrahydrofuran and the like or a mixed solvent thereof. It is also possible to subject cellulose to a surface treatment using a surfactant and the like prior to the mixing.

When the cellulose is derived from paper, the cellulose is eluted in dimethyl acetoamide and lithium chloride. The cellulose is mixed with a solvent which contains a monosaccharide/oligosaccharide derivative in a dissolved state or swollen state. A composite product results in which cellulose and the monosaccharide/-oligosaccharide derivative are chemically interacted.

On the other hand, when bacterial cellulose is employed, a saccharide derivative is first added to a culture medium of a cellulose-producing bacterium. Next, the cellulose-producing bacterium is cultured under such conditions that allows the production of cellulose, and the concurrent production of composite product according to the present invention.

By such a treatment, the number of hydrogen bonds existing in the cellulose molecule can be reduced, and a composite product having better processability than that of the cellulose can be obtained. This will be explained in conjunction with FIG. 1 and FIG. 2.

FIG. 1 schematically illustrates a structure of one example of a composite product comprising the product of cellulose and a cellobiose derivative which is a compound of formula (I) in which "G" comprises a residual group derived from cellobiose. In FIG. 1, each circle represents a glucopyranose residual group and the broken line represents hydrogen bonds between the glucopyranose residual groups. 11 represents a cellobiose derivative molecule and 11a represents a noncarbohydrate residual group in the cellobiose derivative molecule. 12 and 13 represent cellulose molecules (illustratively made of 8 glucopyranose residual groups). These three molecules are assumed to be in the same plane. The cellobiose residual groups constituting the cellobiose derivative 11 form hydrogen bonds with cellulose molecules 12 and 13.

Figure 2:
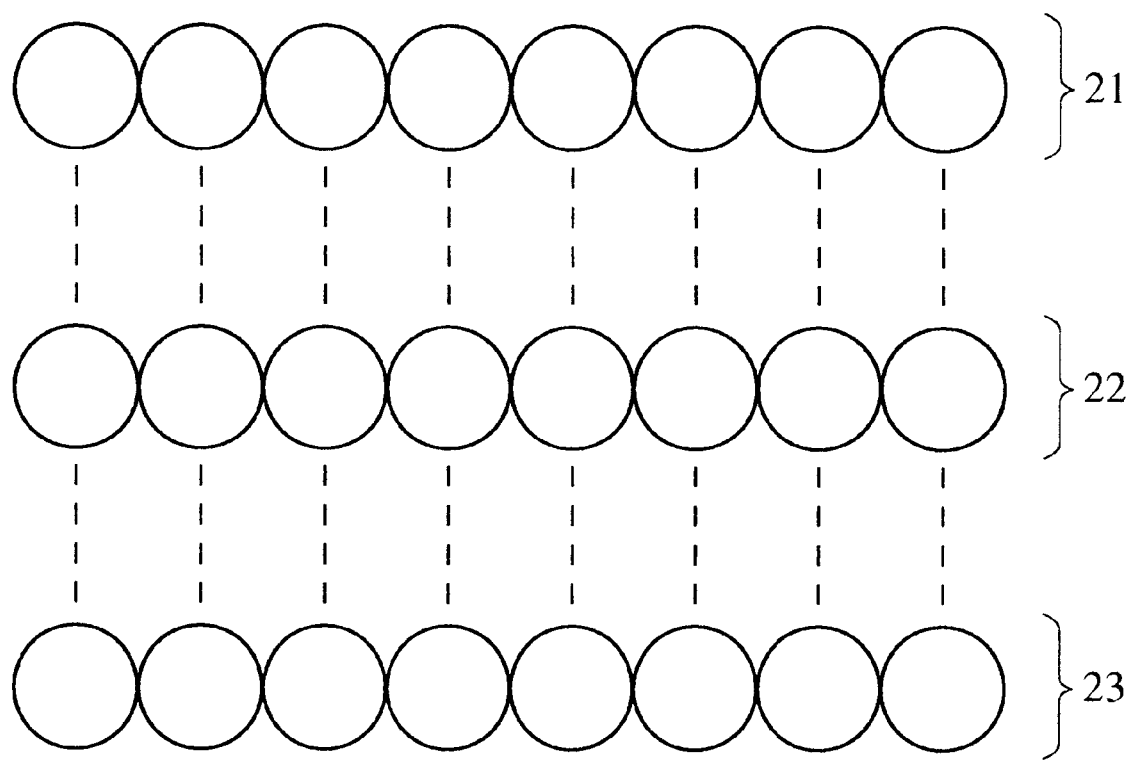
FIG. 2 is a diagrammatic sketch illustrating the conventional structure of cellulose.

On the other hand, the structure of a conventional cellulose type polymer compound comprising 3 cellulose molecules alone (comprising 8 glucose residual groups) is shown illustratively in FIG. 2. 21, 22 and 23 represent 3 cellulose molecules in the same plane and hydrogen bonds are formed between glucopyranose residual groups. The comparison between FIG. 1 and FIG. 2 clearly shows that the hydrogen bonds formed between cellulose molecules are blocked by the saccharide derivative—a compound of formula (I)—in the composite product according to the present invention. Therefore, the number of hydrogen bonds formed between cellulose molecules in the composite product is reduced. As a result, the composite according to the present invention typically acquires the following properties.

First of all, in a composite product which is subjected to pulverization at room temperature, without freezing, there remains a region which is masked by the saccharide derivative—a compound of formula (I)—in the cellulose molecule on the surface of the powder. Therefore, the re-binding of the powder during pulverization can be prevented to a considerable degree. Secondly, because the strong hydrogen bonding between cellulose molecules is alleviated by the saccharide derivative, a molded body which is more flexible than the film comprising cellulose alone, can generally be obtained. Thirdly, due to the interaction between the saccharide derivative exhibiting thermoplasticity—a compound of formula (I)—and cellulose, the composite product has thermoplasticity and can be heat-formed The ratio of the compound of formula (I) in the composite product containing cellulose can be appropriately chosen in a range that does not impair the characteristics of the composite product, such as cohesiveness, thermal characteristics, mechanical strength and the like. For example, the ratio of the saccharide derivative in the composite product containing cellulose is around 1–60%, preferably around 10–40%.

Mold Processing Method

The composite product according to the present invention can be produced by the solvent method or hot-press method which are conventionally known processing methods. Since the composite product shows relatively good solubility to the solvents such as acetone, methanol, and tetrahydrofuran, it can be molded by a solvent method without employing any special solvent. When the solvent method is employed, the synthesis of the composite product and the molding/processing can be simultaneously carried out.

As for the hot-press method, a composite product containing a compound of formula (I) which is synthesized from an aliphatic dicarboxylic acid having 4–14 carbon atoms and contains a monosaccharide residue as G, or a composite product containing a compound of formula (I) which is synthesized from an aliphatic dicarboxylic acid having 6–14 carbon atoms, and containing an oligosaccharide residual group as G, shows thermoplasticity and permits hot-pressing. The strength of the produced hot-press molded body is better than the strength of the conventional cellulose molded body.

As explained above, the following advantages can be obtained:

The composite product comprising cellulose and a monosaccharide derivative or an oligosaccharide derivative can be pulverized by the inhibition of the hydrogen bonds between cellulose molecules. By inclusion of the saccharide having thermoplasticity, the molding processability of the cellulose can be improved.

The molded body of the composite product comprising cellulose and a monosaccharide derivative or an oligosaccharide derivative has better mechanical strength than that of the generally used polyester (PET). Since the molded body of the composite product employs natural products such as cellulose and a monosaccharide or an oligosaccharide, it shows high safety, biodegradability and ability for recycling.

Furthermore, according to the present invention, paper such as waste paper can be effectively utilized as a raw material and the cellulose which is the main component thereof, or saccharide compounds derived from the cellulose, can be chemically modified to provide a saccharide polymer compound having high recycling properties. Therefore, the present invention can contribute to reduction of wastes and effective utilization of resources.

The present invention will be explained using the following illustrative Examples. It should be understood that the present invention is not limited to the composite product employed in the following Examples.

Synthetic Example 1

A compound of formula (I) (an oligosaccharide derivative) represented by the following structural formula (a) which is employed in the following Examples and Comparative Examples was synthesized according to the following method:

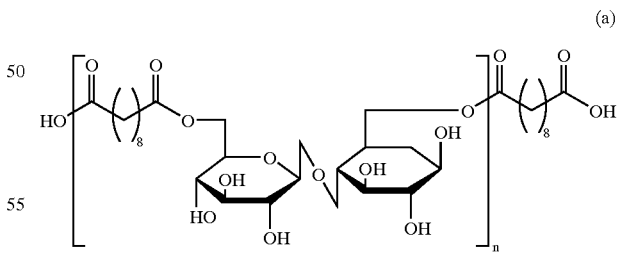

(a)

15 g of cellobiose were added to 400 ml of N,N-dimethylformamide (DMF) and 100 ml of pyridine was added. The mix was heated under nitrogen atmosphere at 70° C. Then, 40 ml of sebacoyl chloride diluted in 100 ml of DMF was added thereto dropwise and the medium was stirred for 3 hours. After the reaction was finished, a part of the solvent was removed by evaporation and the reaction mixture was poured into water and stirred to form a precipitate. A purified precipitate was washed with methanol to yield a white powder (hereinafter referred to as "Compound No. I-1"). The molecular weight of the compound No. I-1 was measured by gel permeation chromatography (GPC), and Mw was 200,000. The measurement conditions were as follows:

Measuring apparatus: HLC 8020 produced by Tosoh Corporation.
Column: 2 columns Mixed-B produced by Polymer Laboratories
Eluate: DMF+0.1% LiBr
Column Oven temperature: 50° C.
Standard: Converted to polysaccharide basis (produced by Polymer Laboratories).

By C=O stretch peak detected at 1743 cm by IR measurement, and C=O group detected at 175 ppm and methylene group detected at 24.8 ppm and 34.1 ppm by 13C-NMR measurement, it was confirmed that a sugar ester copolymer was synthesized.

A compound of formula (I) was synthesized in the process analogous to the above-mentioned process, except that the combination of cellobiose and sebacic acid was changed to the combinations in the following Table 1. The acetylation of the saccharide residual group "Ge" of the compound was carried out by a normal synthesis method, i.e. the compound was heated at 130° C. in sodium acetate-anhydrous acetic acid with stirring.

TABLE 1

| Compound No. | G | R | n |
| --- | --- | --- | --- |
| I-2 | cellobiose | $C_4H_8$ | 200 |
| I-3 | maltose | $C_8H_{16}$ | 41 |
| I-4 | maltose | o-phenylene | 152 |
| I-5 | lactose | $C_6H_{12}$ | 500 |
| I-6 | lactose | p-phenylene | 260 |
| I-7 | maltotriose | $C_7H_{14}$ | 310 |
| I-8 | maltotriose | $C_4H_8$ | 30 |
| I-9 | cellotetraose | $C_{12}H_{24}$ | 422 |
| I-10 | cellotetraose | p-phenylene | 21 |
| I-11 | maltopentaose | $C_{10}H_{20}$ | 350 |
| I-12 | maltopentaose | o-phenylene | 80 |
| I-13 | cellohexaose | $C_{14}H_{28}$ | 116 |
| I-14 | cellohexaose | m-phenylene | 800 |
| I-15 | glucopyranose | $C_{10}H_{20}$ | 900 |
| I-16 | glucopyranose | $C_3H_6$ | 86 |
| I-17 | mannopyranose | $C_6H_{12}$ | 1600 |
| I-18 | mannopyranose | $C_2H_4$ | 900 |
| I-19 | maltose | $C_6H_{12}$ | 650 |
| I-20 | cellohexaose | $C_7H_{14}$ | 2900 |
| I-21 | acetylmaltose | $C_8H_{16}$ | 250 |
| I-22 | acetylcellobiose | $C_9H_{18}$ | 4630 |
| I-23 | acetyllactose | $C_5H_{10}$ | 90 |
| I-24 | acetylglucopyranose | $C_8H_{16}$ | 1250 |
| I-25 | acetylgalactopyranose | $C_{10}H_{20}$ | 560 |

EXAMPLE 1

Formation of a Molded Product of a Composite Product by Solvent Method

To a 30% by weight aqueous suspension of finely divided powder cellulose (KC Flock 400 G: produced by Nippon Paper Industry Co. Ltd.) there was added Compound No. I-8 in an amount of 20% by weight, then heated at 50° C. with stirring. Then, the aqueous suspension was heated and dried at 95° C., the obtained dried film was ground at a room temperature by a grinder to give a finely divided powder having a size (which represents an average particle size) of about 10 μm. The powder did not agglomerate. The powder was dispersed in methanol and the dispersion was cast on a Teflon® sheet and dried to give a molded product in the form of a sheet having a thickness of 0.5 mm. This is product 1).

To a 20% by weight aqueous suspension of cellulose in the form of a microfilament (Celish FD100: produced by Daicel Chemical Industry, Ltd.) was added Compound No. I-23 in an amount of 10% by weight, and the mix was heated at 50° C. with stirring. Then, the aqueous suspension was heated and dried at 100° C., the obtained dried film was ground at a room temperature by a grinder to give a finely divided powder having a size of about 10 μm. The powder did not agglomerate. The powder was dispersed in acetone and the dispersion was cast on a Teflon® sheet in the same manner as that used in the above-mentioned process 1) and dried to give a molded product in the form of a sheet. This is product 2).

To a 20% by weight methanol suspension of cellulose in the form of a microfilament (Abisel: produced by Asahi Chemical Industry Co. Ltd.) was added Compound No. I-10 in an amount of 10% by weight, and the mix was heated at 50° C. with stirring. Then, the methanol suspension was cast on a Teflon sheet in the same manner as that used in the above-mentioned process 1) and dried to give a molded product in the form of a sheet. This is product 3).

To Hestrin-Schramm standard medium (glucose 2.0%, peptone 0.5%, yeast extract 0.5%, disodium phosphate 0.15%, and citric acid 0.27%: % is based on weight) was added Compound No. I-15 in an amount of 5% by weight, and *Acetobactor Xylinum* (body cell number ATCC 23769) was cultured at 28° C. therein by static culture. 30 days later, a gelatinous film was accumulated on the upper layer of the culture medium. The film was sufficiently washed with water and treated by a pressing machine and water absorbed by the film was squeezed out. Then the pressed film was heated and dried at 105° C. The dried film was subjected to a grinder at a room temperature to give a finely divided powder having a size of about 10 μm. The powder did not agglomerate. The powder was dispersed in acetone and the dispersion was cast on a Teflon sheet in the same manner as that used in the above-mentioned process 1) to give a molded product in the form of a sheet. This is product 4).

Used regenerated paper for PPC (EN-500, A4 produced by Canon Sales Co., Ltd.) (one side of which was printed by NP copying machine) was cut into a size of 5 mm×5 mm and 100 g thereof were added to 3 L of an enzyme solution and stirred at 45° C. for 6 hours. The enzyme solution was made by dissolving 10 g of cellulase (Meicelase TP 60, produced by Meiji Seika Kaisha Ltd.) in 3 L of acetic acid/sodium acetate aqueous solution (pH 4.5). After the reaction, 200 ml of methanol was added and the insoluble residue was filtered out and passed through an ion-exchange resin column (Amberlite IR-120 B, available from Organo Corporation) of 50 cm, and the solvent was removed by evaporation to give 64 g of a pale yellow powder.

The substance was confirmed to be a mixture containing glucose, cellobiose, and cellotriose as main components from gel permeation chromatography and IR absorption spectrum. 50 g of thus obtained saccharide mixture was suspended in a mixed solvent comprising 400 ml of acetonitrile and 200 ml of pyridine and heated under nitrogen atmosphere at 80° C. 40 ml of sebacoyl chloride diluted in 200 ml of acetonitrile was added thereto and stirred further for 2 hours. After a part of the solvent was removed by evaporation, it was poured into water and stirred to form a precipitate. The precipitate was washed with acetone, and dried to give 42 g of a pale yellow powder. The weight average molecular weight of the product was about 50,000. The procedure analogous to that of above-mentioned process 1) was carried out except that the above-mentioned Compound No. I-8 was replaced with the sugar chain compound thus obtained, and a molded product in the form of a sheet was obtained. This is product 5).

Used regenerated paper for PPC (EN-500, produced by Canon Sales Co., Ltd.) (one side of which was printed by a copying machine) was cut into a size of 2 mm×2 mm and 100 g of these old paper chips were heated in 1 L of water under reflux for 5 hours, then washed with methanol and dried. Then it was added to 1 L of dimethylacetamide containing 70 g of anhydrous lithium chloride and the mix was stirred at 70° C. for 6 hours. The solution was filtered to give a cellulose solution. 20 g of Compound No. I-1 were added to the cellulose solution and stirred at a room temperature, then the solution was cast on a Teflon sheet and dried to give a molded product in the form of a sheet having thickness of 0.5 mm. This is product 6).

Test chips in the form of a strip (1 cm in width, 6 cm in length and 0.5 mm in thickness) were cut out from the molded products of the composite products prepared in the above-mentioned processes 1)–6), and the flexibility thereof was evaluated by Autograph (produced by Instron). The measurement was carried out under the measuring conditions of bending speed: 0.5 mm/min and distance between supporting points: 30 mm. A molded product wherein a crack and the like was not found by visual observation was evaluated as A. The molded product wherein a crack and the like was found was evaluated as B. The results are given in Table 2.

The evaluation of the biodegradability was also carried out; the molded products prepared as products 1)–6) were buried in matured compost and 6 months later, those which were decomposed and did not maintain the original form were evaluated as A, and those maintained the original form were evaluated as B.

Comparative Example 1

A 2% by weight copper ammonia solution of a finely divided powder cellulose (KC Flock 400 G; produced by Nippon Paper Industry Co. Ltd.) was cast on a Teflon sheet in the manner analogous to that of the above-mentioned product 1) to give a molded product in the form of a sheet. The flexibility and the biodegradability of the molded product was evaluated in a similar manner as that of the molded products 1)–4). The results are given in the following Table 2.

TABLE 2

| Molded product | | Bending strength | Biodegradability |
|---|---|---|---|
| Example | 1) | A | A |
| | 2) | A | A |
| | 3) | A | A |
| | 4) | A | A |
| | 5) | A | A |
| | 6) | A | A |
| Comparative example 1 | | B | A |

As shown in Table 2, the molded products comprising the composite product of 1)–6) have improved flexability compared to the film comprising cellulose alone. The biodegradability, which is a superior property of cellulose, was confirmed to be retained.

EXAMPLE 2

Formation of a Molded Product of a Composite Product by Hot-Press Method

To a 20% by weight aqueous suspension of cellulose in the form of a microfilament (Celish FD100: produced by Daicel Chemical Industry, Ltd.) was added Compound No. I-1 in an amount of 20% by weight and the suspension heated at 50° C. with stirring. Then, the aqueous suspension was heated and dried at 105° C., the obtained dried film was ground at a room temperature by a grinder to give a finely divided powder having a size of about 10 μm. The powder did not agglomerate. The powder was subjected to hot-press treatment with a hot-press machine for use in test (available under the trade name of Mini Test Press-10 from Toyo Seiki Seisaku-Sho, Ltd.) at 140° C., 25 kg/cm$^2$ to give a planar molded product designated as 7).

To 20 g of a 1% by weight methanol solution of a surfactant (Neugen ET-149: produced by Dai-ichi Kogyo Seiyaku Co., Ltd.) was added 30 g of cellulose in the form of a microfilament (KC Flock W-100: produced by Nippon Paper Industry Co. Ltd.) and the solution stirred in a homogenizer at 10,000 rpm for 5 minutes. Then the solution was filtered by aspiration and dried at 90° C. for 10 minutes in an air circulating oven to carry out surface treatment. 25 g of the treated cellulose were mixed with 15 g of Compound No. I-3 and subjected to dispersing by rollers for 24 hours. After 24 hours, a homogeneous powder was obtained which did not agglomerate. The powder was subjected to hot-press treatment with a hot-press machine for use in test (available under the trade name of Mini Test Press-10 from Toyo Seiki Seisaku-Sho, Ltd.) at 120° C., 30 kgf/cm$^2$ to give a planar molded product designated as 8). Cellulose in the form of a microfilament (Abisel: produced by Asahi Chemical Industry Co. Ltd.) was subjected to surface treatment in the similar manner as that used in making product 8) using a surfactant. 30 g of the treated cellulose were mixed with 20 g of Compound No. I-20 and heated with stirring in THF at 50° C. The obtained solution was heated and dried at 80° C. The dried film was ground at a room temperature by a grinding machine and a finely divided powder having a size of about 11 μm was obtained. The powder did not agglomerate. The powder was subjected to hot-press treatment with a hot-press machine for use in test (available under the trade name of Mini Test Press-10 from Toyo Seiki Seisaku-Sho, Ltd.) at 127° C., 28 kgf/cm$^2$ to give a planar molded product designated as 9).

To a 25% by weight aqueous suspension of cellulose in the form of a microfilament (KC Flock W-300: produced by Nippon Paper Industry Co. Ltd.) was added Compound No. I-25 in an amount of 15% by weight, and the suspension heated with stirring at 55° C. The aqueous suspension was heated and dried at 100° C., then the obtained dried film was subjected to a grinding machine at a room temperature to give a finely divided powder having a size of about 10 μm. The powder did not agglomerate. The powder was subjected to hot-press treatment with a hot-press machine for use in test (available under the trade name of Mini Test Press-10 from Toyo Seiki Seisaku-Sho, Ltd.) at 120° C., 25 kgf/cm$^2$ to give a planar molded product designated as 10).

To Hestrin-Schramm standard medium employed to make product 4) of Example 1, was added Compound No. I-13 in an amount of 5% by weight, and Acetobactor Xylinum was cultured therein by static culture at 28° C. 30 days later, a gelatinous film was accumulated on the upper layer of the culture medium. The film was sufficiently washed with water and treated by a pressing machine and water absorbed by the film was squeezed out. Then the pressed film was heated and dried at 105° C. The dried film was treated by a grinder at a room temperature to give a finely divided powder having a size of about 10 μm. The powder did not agglomerate. The powder was subjected to hot-press treatment with a hot-press machine for use in test (available under the trade name of Mini Test Press-10 from Toyo Seiki Seisaku-Sho, Ltd.) at 125° C., 28 kgf/cm² to give a planar molded product designated as 11).

To Hestrin-Schramm standard medium employed to make product 4) of Example 1, was added Compound No. I-17 in an amount of 5% by weight, and Acetobactor xylinum was cultured therein by static culture at 28 C. 30 days later, a gelatinous film was accumulated on the upper layer of the culture medium. The film was sufficiently washed with water and treated by a pressing machine and water absorbed by the film was squeezed out. Then the pressed film was heated and dried at 105° C. The dried film was treated by a grinder at a room temperature to give a finely divided powder having a size of about 10 $\mu$m. The powder did not agglomerate. The powder was subjected to hot-press treatment with a hot-press machine for use in test (available under the trade name of Mini Test Press-10 from Toyo Seiki Seisaku-Sho, Ltd.) at 118° C., 23 kgf/cm² to give a planar molded product designated as 12).

The process analogous to that of the above-mentioned product 7) of Example 2 was carried out except that the compound No. I-1 was replaced with a sugar chain compound synthesized in the similar manner to that of product 5) of Example 1 and a planar molded product was obtained designated as 13).

The process analogous to that of the above-mentioned product 7) of Example 2 was carried out except that 20% by weight aqueous suspension of cellulose in the form of a microfilament was replaced with the cellulose solution of product 6) in Example 1 and a planar molded product was obtained which was designated 14).

Test chips in the form of a strip (1 cm in width, 6 cm in length and 0.5 mm in thickness) were cut out from the molded products 7)–14), and the tensile strength thereof was evaluated by Autograph DSC-R-500 (produced by Shimadzu Corporation). The measurement was carried out under the measuring conditions of load cell: 50 kg, crosshead speed: 50 mm/min, and distance between work holding devices: 10 mm. As a control, test chips in the similar form were cut out from molded product made from a general use polyester (PET), and tested and the results were compared and examined. The product showing better tensile strength than that of PET was evaluated as A, the same level of tensile strength as B and poorer tensile strength as C. The results are given in Table 3.

The evaluation of the biodegradability was also carried out on 8 kinds of the molded products produced in the similar manner to those of products 7)–14) of Example 2; the molded products were buried in matured compost and 6 months later, those which were decomposed were evaluated as A, and those which were not decomposed were evaluated as B. The results are given in Table 3.

TABLE 3

| Molded product | | Tensile strength | Biodegradability |
| --- | --- | --- | --- |
| Example 2 | 7) | A | A |
| | 8) | A | A |
| | 9) | A | A |
| | 10) | A | A |
| | 11) | A | A |
| | 12) | A | A |
| | 13) | A | A |
| | 14) | A | A |

As shown in Table 3, the molded products comprising the composite product of. product 7)–14) of Example 2 are confirmed to have biodegradability and have a tensile strength which is sufficient for practical use.

Comparative Example 2

A 20% by weight aqueous suspension of cellulose in the form of a microfilament which was prepared in the similar manner to that product 7) of Example 2 was heated at 50° C. with stirring then the aqueous suspension was heated and dried at 105° C. The obtained dried substance was subjected to a grinding machine at a room temperature. However, a finely divided powder as that obtained for product 7) of Example 2 was not obtained and the produced substance had a size of over 150 $\mu$m. Further, the powder was apt to agglomerate. The powder was subjected to hot-press treatment in the similar manner to that used in product 7) of Example 2, however, a planar molded product could not be obtained.

Comparative Example 3

Bacterial cellulose which had been obtained from a culture solution described the making of product 11) of Example 2, except that a saccharide derivative was not added, was subjected to the similar treatment to that in making product 11) of Example 2. However, a finely divided powder was not obtained and the produced substance had a size of over 100 $\mu$m. Further, the powder was apt to agglomerate. The powder was subjected to hot-press treatment in the similar manner to that used in to make product 7) of Example 2, however, a planar molded product could not be obtained.

EXAMPLE 3

A powder of a composite product prepared in the similar process to the product 1) of Example 1 was stirred in esterase enzyme (available from Boehringer Mannheim Co., with the pH controlled to 8.6) at 40° C. for 7 days. The reaction mixture was filtered to remove cellulose. The filtrate was adjusted to show pH of 5 using 0.1 N HCl and the resulting insoluble component was filtered out. The filtrate was filtered through an ion-exchange resin (Amberlite IR-120B, produced by organo Corporation) and dried. The insoluble component was confirmed to be adipic acid and the soluble component was confirmed to be maltotriose by measurement of IR spectrum.

The obtained maltotriose and adipic acid were used as raw materials for re-polymerization, with the adipic acid being converted into adipoyl chloride using thionyl chloride. From the recovered maltotriose and adipic acid chloride, a saccharide derivative (compound No. I-8) could be synthesized in the similar manner to that used in the Synthetic Example. By the use of the resynthesized saccharide derivative (Compound No. I-8) and the recovered cellulose, the composite could be prepared again according to the process used to make product 1) of Example 1. It was confirmed that recycling is possible.

Similarly, the molded products produced in the similar manner to that used in the processes to make products 2)–4) of Example 1, and in the processes to make products 7)–12) of Example 2 could be decomposed in the similar manner to the hydrolysis by the above-mentioned enzyme, into saccharides, dicarboxylic acids and cellulose, and from the saccharides and the dicarboxylic acids, the corresponding saccharide derivatives can be resynthesized. Also, from the resynthesized saccharides derivatives and recovered cellulose, molded products could be prepared. Therefore, it was confirmed that recycling is possible.

The invention is not to be limited as except as set forth in the following claims. Other variations and obvious embodiments will be apparent to those of ordinary skill in this art.

What is claimed is:

1. A composite product comprising cellulose and a compound of formula (I):

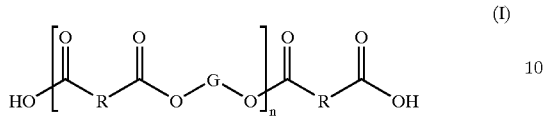

wherein R is a substituted or unsubstituted alkylene group or a substituted or unsubstituted arylene group, G is a monosaccharide residual group or an oligosaccharide residual group and n is an integer between 1 and 5000.

2. A composite product according to claim 1, wherein the saccharide residual group G is at least one selected form the group consisting of glucopyranose, cellooligosaccharide, maltooligosaccharide, and lactose.

3. A composite product according to claim 2, wherein the saccharide residual group G is cellobiose.

4. A composite product according to claim 2, wherein the saccharide residual group G is maltose.

5. A composite product according to claim 2, wherein the saccharide residual group G is lactose.

6. A composite product according to claim 2, wherein the saccharide residual group G is glucopyranose.

7. A composite product according to claim 1, claim 3 or claim 6, wherein the saccharide residual group G is a saccharide residual group formed from paper.

8. A composite product according to claim 1, wherein the cellulose is formed from a plant.

9. A composite product according to claim 1, wherein the cellulose is bacterial cellulose.

10. A composite product according to claim 1, wherein the cellulose is formed from paper.

11. A composite product according to claim 1, wherein G is an oligosaccharide residual group and R is a cellulose composite product comprising an alkylene group containing 6 to 14 carbon atoms.

12. A composite product according to claim 1, wherein G is a monosaccharide residual group and R is a cellulose composite product comprising an alkylene group containing 4 to 14 carbon atoms.

13. A molded product comprising a composite product of claim 1.

14. A molded product according to claim 13, wherein the product is obtained by hot-press treatment.

15. A composite product formed by interacting cellulose and a compound of formula I

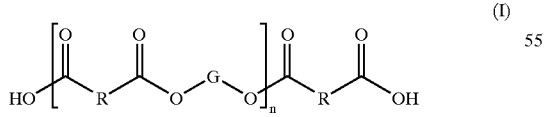

wherein R is substituted or unsubstituted alkylene group or a substituted or unsubstituted arylene group, G is a monosaccharide residual group or an oligosaccharide residual group and n is an integer between 1 and 5000.

16. A method for producing a composite product comprising the steps of:

(a) providing a liquid containing dissolved or dispersed (i) cellulose and (ii) a compound represented by formula (I):

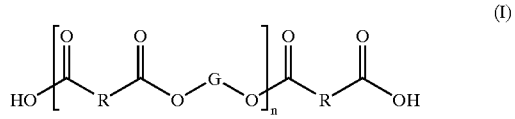

wherein R is a substituted or unsubstituted alkylene group or a substituted or unsubstituted arylene group, G is a monosaccharide residual group or an oligosaccharide residual group and n is an integer between 1 and 5000; and (b) evaporating the liquid.

17. A method according to claim 16, wherein the liquid is formed by mixing the compound of formula (I) and a suspension of cellulose in the form of a microfilament.

18. A method according to claim 16, wherein the liquid is formed by mixing the compound of formula (I) and a mixed solvent of dimethyl acetamide and anhydrous lithium chloride containing dissolved cellulose.

19. A method according to claim 18, wherein the mixed solvent of dimethyl acetamide and anhydrous lithium chloride containing dissolved cellulose is produced by disintegrating paper in an alkaline solution to provide cellulose fibers; and thereafter adding the cellulose fibers to the mixed solvent of dimethyl acetamide and anhydrous lithium chloride to dissolve the cellulose in the mixed solvent.

20. The composite product produced by the method of claim 16.

21. A process for producing a composite product comprising: culturing cellulose-producing bacteria in a culture medium containing a compound of formula I

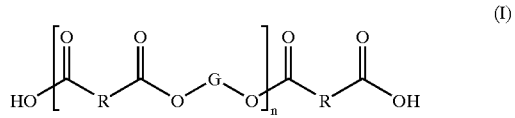

and making the bacteria produce cellulose, wherein R represents a substituted or unsubstituted alkylene group or a substituted or unsubstituted arylene group, G represents a monosaccharide residual group or an oligosaccharide residual group and n is an integer between 1 and 5000.

22. The composite product produced by the method of claim 21.

23. A method according to claim 16, wherein the compound represented by the formula (1) is obtained by the steps of:

(i) extracting cellulose from paper and obtaining the monosaccharide residual group or the oligosaccharide residual group; and (ii) combining the monosaccharide residual group or the oligosaccharide residual group with dicarboxylic acid, said dicarboxylic acid comprising the substituted or unsubstituted alkylene group or the substituted or unsubstituted arylene group.

24. A method comprising the steps of:

(i) extracting cellulose from paper;

(ii) combining in a liquid the cellulose and a compound of formula (I):

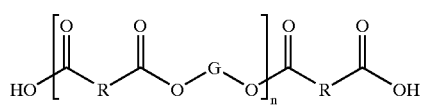 (I)

wherein R is a substituted or unsubstituted alkylene group or a substituted or unsubstituted arylene group, G is a monosaccharide residual group or an oligosaccharide residual group and n is a degree of polymerization and an integer between 1 to 5000;

(iii) evaporating the liquid; and (iv) producing a cellulose compound product containing cellulose and the compound represented by the formula (I).

* * * * *

UNITED STATES PATENT AND TRADEMARK OFFICE
CERTIFICATE OF CORRECTION

PATENT NO. : 6,468,668 B1
DATED : October 22, 2002
INVENTOR(S) : Masato Minami et al.

It is certified that error appears in the above-identified patent and that said Letters Patent is hereby corrected as shown below:

Column 1,
Line 55, "prevent" should read -- present --.

Column 3,
Line 27, "t:he" should read -- the --; and
Line 44, "can" should read -- can form a --.

Column 5,
Line 47, "view point" should read -- viewpoint --.

Column 6,
Line 63, "allows" should read -- allow --.

Column 7,
Line 47, "heat-formed" should read -- heat-formed. --.

Column 8,
Lines 49-57,

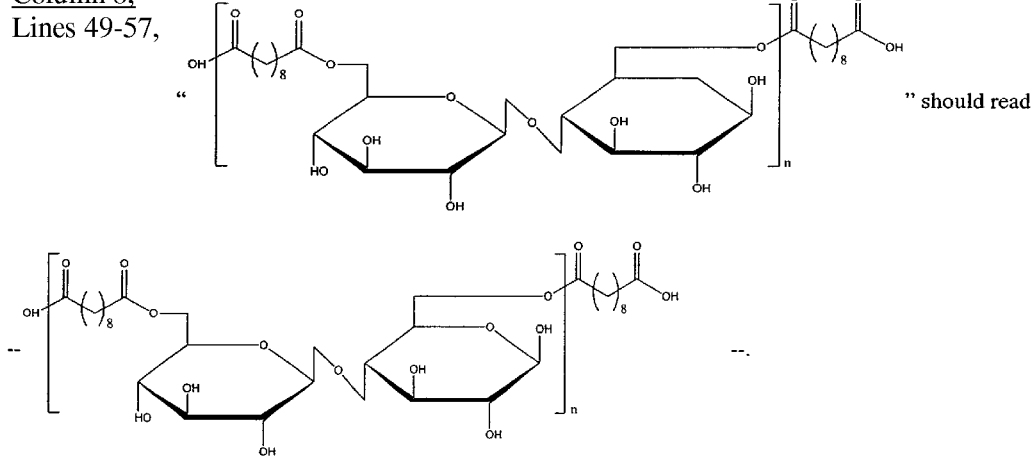

Line 59, "15g" should read -- 50g --.

Column 12,
Line 26, "Cellulose" should read -- ¶ Cellulose --.

UNITED STATES PATENT AND TRADEMARK OFFICE
CERTIFICATE OF CORRECTION

PATENT NO.   : 6,468,668 B1
DATED        : October 22, 2002
INVENTOR(S)  : Masato Minami et al.

It is certified that error appears in the above-identified patent and that said Letters Patent is hereby corrected as shown below:

<u>Column 14,</u>
Line 41, "organo" should read -- Organo --.

Signed and Sealed this

Fifth Day of August, 2003

JAMES E. ROGAN
*Director of the United States Patent and Trademark Office*